(12) United States Patent
Khatri et al.

(10) Patent No.: US 6,799,278 B2
(45) Date of Patent: Sep. 28, 2004

(54) SYSTEM AND METHOD FOR PROCESSING POWER MANAGEMENT SIGNALS IN A PEER BUS ARCHITECTURE

(75) Inventors: Mukund Purshottam Khatri, Austin, TX (US); Shawn Joel Dube, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 571 days.

(21) Appl. No.: 09/742,645

(22) Filed: Dec. 21, 2000

(65) Prior Publication Data

US 2002/0083349 A1 Jun. 27, 2002

(51) Int. Cl.[7] .............................. G06F 1/26; G06F 1/32
(52) U.S. Cl. ..................... 713/300; 713/320; 713/323
(58) Field of Search ................................. 713/300, 322, 713/323, 310, 320

(56) References Cited

U.S. PATENT DOCUMENTS

| | | | |
|---|---|---|---|
| 5,070,450 A | 12/1991 | Holman, Jr. et al. | 395/750 |
| 5,423,045 A | 6/1995 | Kannan et al. | 395/750 |
| 5,560,022 A | 9/1996 | Dunstan et al. | 395/750 |
| 5,638,541 A | 6/1997 | Sadashivaiah | 395/750 |
| 5,675,364 A | 10/1997 | Stedman et al. | 345/211 |
| 5,708,819 A | 1/1998 | Dunnihoo | 395/750 |
| 5,790,873 A | 8/1998 | Popper et al. | 395/750.01 |
| 5,862,393 A | 1/1999 | Davis | 395/750.01 |
| 5,890,004 A | 3/1999 | Poisner | 395/750.01 |
| 5,910,930 A | * 6/1999 | Dieffenderfer et al. | 368/156 |
| 5,926,404 A | 7/1999 | Zeller et al. | 364/707 |
| 5,938,771 A | * 8/1999 | Williams et al. | 713/310 |
| 6,052,793 A | 4/2000 | Mermelstein | 713/340 |
| 6,055,643 A | 4/2000 | Chaiken | 713/323 |

(List continued on next page.)

FOREIGN PATENT DOCUMENTS

JP 11085335 A1 3/1999 ............ G06F/1/32

OTHER PUBLICATIONS

Lu et al, "Software Controlled Power Management", Computer System Laboratory, Stanford University, 1999, pp 157–161.*

U.S. Pending patent application Ser. No. 09/317,309 entitled "Using RTC Wake–Up Enable Recovery from Power Failures" by Alexander et al.: Assigned to Dell USA L.P. (DC–01678).

U.S. Pending patent application Ser. No. 09/484,329 entitled "Preventing False Remote System Wake Events Following AC Power Loss" by Jue; Assigned to Dell USA L.P. (DC–02121).

*Primary Examiner*—Thomas Lee
*Assistant Examiner*—Chun Cao
(74) *Attorney, Agent, or Firm*—Baker Botts L.L.P.

(57) ABSTRACT

A system and method for handling number power management signals, such as PME# signals, is disclosed. The power management signal lines are coupled to general purpose inputs in the south bridge or super I/O. The general purpose input that received the power management signal records the assertion of a power management signal. A logical circuit is employed to logically OR the power management signals to a single dedicated power management signal input so that the computer system will power up if any PCI device asserts a power management signal. The BIOS records the identity of the general purpose that received the power management signal in a memory location associated with that general purpose input or as a virtualized power management signal input. The operating system checks the memory location or virtualized power management signal input to determine which power management signal line transmitted the power management signal. The operating system can then identify the correct PCI bus and search for the PCI device that asserted the power management signal.

26 Claims, 2 Drawing Sheets

U.S. PATENT DOCUMENTS

| | | | |
|---|---|---|---|
| 6,085,328 A | 7/2000 | Klein et al. | 713/310 |
| 6,108,426 A | 8/2000 | Stortz | 381/77 |
| 6,119,194 A * | 9/2000 | Miranda et al. | 710/306 |
| 6,142,452 A | 11/2000 | Denman et al. | 256/13.1 |
| 6,173,943 B1 | 1/2001 | Welch et al. | 256/13.1 |
| 6,272,645 B1 * | 8/2001 | Wang | 713/323 |
| 6,477,655 B1 * | 11/2002 | Delvaux et al. | 713/323 |
| 6,496,888 B1 * | 12/2002 | Pole, II | 710/110 |
| 6,564,330 B1 * | 5/2003 | Martinez et al. | 713/322 |
| 6,571,341 B1 * | 5/2003 | Forbes | 713/323 |

* cited by examiner

SYSTEM AND METHOD FOR PROCESSING POWER MANAGEMENT SIGNALS IN A PEER BUS ARCHITECTURE

TECHNICAL FIELD

The present disclosure relates in general to the field of computer systems, and, more particularly, to a system and method for handling numerous power management signals in a multiple-peer bus computer environment.

BACKGROUND

The peripheral component interconnect (PCI) local bus standard is implemented in most computer systems, along with the more general industry standard architecture (ISA) expansion bus. Generally, PCI is a 32-bit or 64-bit bus and can run at clock speeds of 33 or 66 MHz. The PCI bus provides a mechanism to allow a device to wake or turn on the computer system containing the PCI bus while the computer system is powered-down or in a sleep state. The PCI bus implements this mechanism through a power management signal such as a power management event (PME#) signal. Any computer component or device may assert a power management signal to request that the computer system power up. For example, an outside system may attempt to access a local computer system that has powered down. The network card of the powered down local computer system may wake the local computer system in response to the outside system's attempts to access the local computer system. Another example may be one in which a system component detects an imminent failure and wakes the powered down computer system to prevent the loss of data.

Typically, the power management signal is transmitted to the south bridge, super I/O, or other computer component operable to control the power state of the computer system. Upon the assertion of the power management signal, the south bridge or super I/O will power up the computer system and record in one of the registers associated with the south bridge or super I/O the reason for the power up or wake-up event. The operating system (OS) for the computer system may utilize a power management specification such as the advanced configuration and power interface (ACPI) specification. ACPI enables the OS to control the amount of power delivered to each device coupled to the computer system. With ACPI, the OS can turn off peripheral devices that are not in use. Alternatively, ACPI may be used to power up the computer system upon receipt of a signal from a peripheral device. If the OS utilizes ACPI or a similar power management specification, the OS can access this register to determine the that the cause of the power-up was the assertion of a power management signal. The OS may then scan the PCI buses to determine which device or devices asserted the power management signal. Once the PCI devices have been identified, the OS can acknowledge the power management signal and the PCI device will cease asserting the power management signal.

The PCI buses are preferably configured in a peer bus arrangement rather than a hierarchical arrangement. In a hierarchical arrangement, one bus is connected to the north bridge, or other device that serves as the primary interconnect between major system components. The other buses are connected to the north bridge through this primary bus. A hierarchical arrangement is typically implemented due to hardware constraints that prevent coupling several devices to a single bus or single bus type. In contrast, in a peer bus arrangement, each bus is directly connected to the north bridge. As a result, the peer buses have a higher throughput than hierarchical buses.

However, several leading OSs require a dedicated power management signal input for each peer bus in order for the OS to successfully determine from which bus a wake-up event was requested. Therefore, if the computer system contains four peer buses that are operable to transmit power management signals, then the chip set must contain four dedicated power management signal inputs. The dedicated power management signal inputs are operable to initiate a power-up and record the wake-up event in a register that may be accessed by the OS. If the computer system does not implement a dedicated power management signal input for each peer bus, then an OS deadlock condition may occur when the OS attempts to acknowledge the transmission of a power management signal. For example, if the OS scans a bus that did not in fact communicate a power management signal, the OS may become caught in an infinite loop as it repetitively scans the incorrect bus in an attempt to determine which PCI device or card had asserted the power management signal. As long as each peer bus has a dedicated power management signal input that will receive power management signals from that peer bus, this type of OS deadlock can be avoided.

Unfortunately, conventional chip sets only provide a limited number of power management signal inputs. For example, many conventional chip sets only provide up to four dedicated power management signal inputs. This limitation is highlighted by the trend in computer system design to increase the number of peer buses installed in a computer system in order to accommodate a larger number of PCI devices. As a result, OS deadlock conditions are a concern for computer systems that contain a large number of peer buses and run one of many leading OSs which require dedicated power management signal inputs. In order to avoid the risk of OS deadlock, power management signaling must be limited such that only a few peer buses are capable of waking the computer system. For example, if the chip set only provides two dedicated power management signal inputs, then the computer system is limited to having only two peer buses that are operable to wake the computer system. Thus, conventional power management signaling methods are inadequate for computer systems that are running certain types of OSs and are intended to couple with a large number of PCI devices.

SUMMARY

In accordance with teachings of the present disclosure, a system and method for communicating multiple power management signals to an I/O interface component of a computer system are disclosed that provide significant advantages over prior developed systems.

The system and method of the present invention utilizes a logic circuit to logically OR the power management signals from the PCI buses and couple the output signal to the dedicated power management signal input on the south bridge, super I/O or other power state management device. This configuration allows any power management signal sent by a PCI device to issue a power up request to the computer system. Because the power management signal may be negatively asserted, such as a PME# signal for example, the logical OR function may be accomplished by an AND logic gate. In addition, each power management signal is also coupled to an individual general purpose input on the south bridge, super I/O, or other power state management device. Each general purpose input can store the status from its respective power management signal.

When a PCI device asserts a power management signal, the OR logic will transmit the signal to the dedicated power management signal input and thereby issue a power-up request to the computer system. The power management signal assertion is recorded by the dedicated general purpose input for that particular PCI bus. After the computer system boots, the BIOS checks the power state management device to determine whether the computer system powered up as a result of a power management signal assertion, and if so, checks which power management signal general purpose input or inputs were tripped. The BIOS makes available to the OS the locations or addresses of the general purpose inputs that store the status from each asserted power management signal. By reading the general purpose inputs at these addresses, the OS can identify the bus or buses on which a PCI device is asserting a power management signal. The OS can then search the correct bus or buses and locate the PCI devices that are asserting the power management signals.

Alternatively, instead of reporting the availability of the power management signal input to the OS, the BIOS creates and makes available to the OS a virtualized power management signal input or a memory location corresponding to the general purpose input so that the OS can identify from which bus the power management signal is being asserted. The OS checks this virtualized power management signal input or memory location and subsequently determines on which bus or buses resided the device or devices that asserted the power management signal. The OS can then search the correct bus or buses and locate the PCI devices that are asserting power management signals.

A technical advantage of the present invention is that the power management signals are tied together as one signal that may be transmitted to a single dedicated power management signal input in the power state management device. Because the power management signal input is virtualized, the OS can still determine on which bus resided the device that asserted the power management signal. As a result, the number of PCI devices that may be coupled to the computer systems is not limited by the number of dedicated power management signal inputs in the power state management device. Thus, the computer system may be coupled to several PCI devices without the risk of an OS deadlock condition. Another advantage of the present invention is that it may be implemented with currently available components. It is not necessary to modify the south bridge or super I/O because only one power management signal input is required.

Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
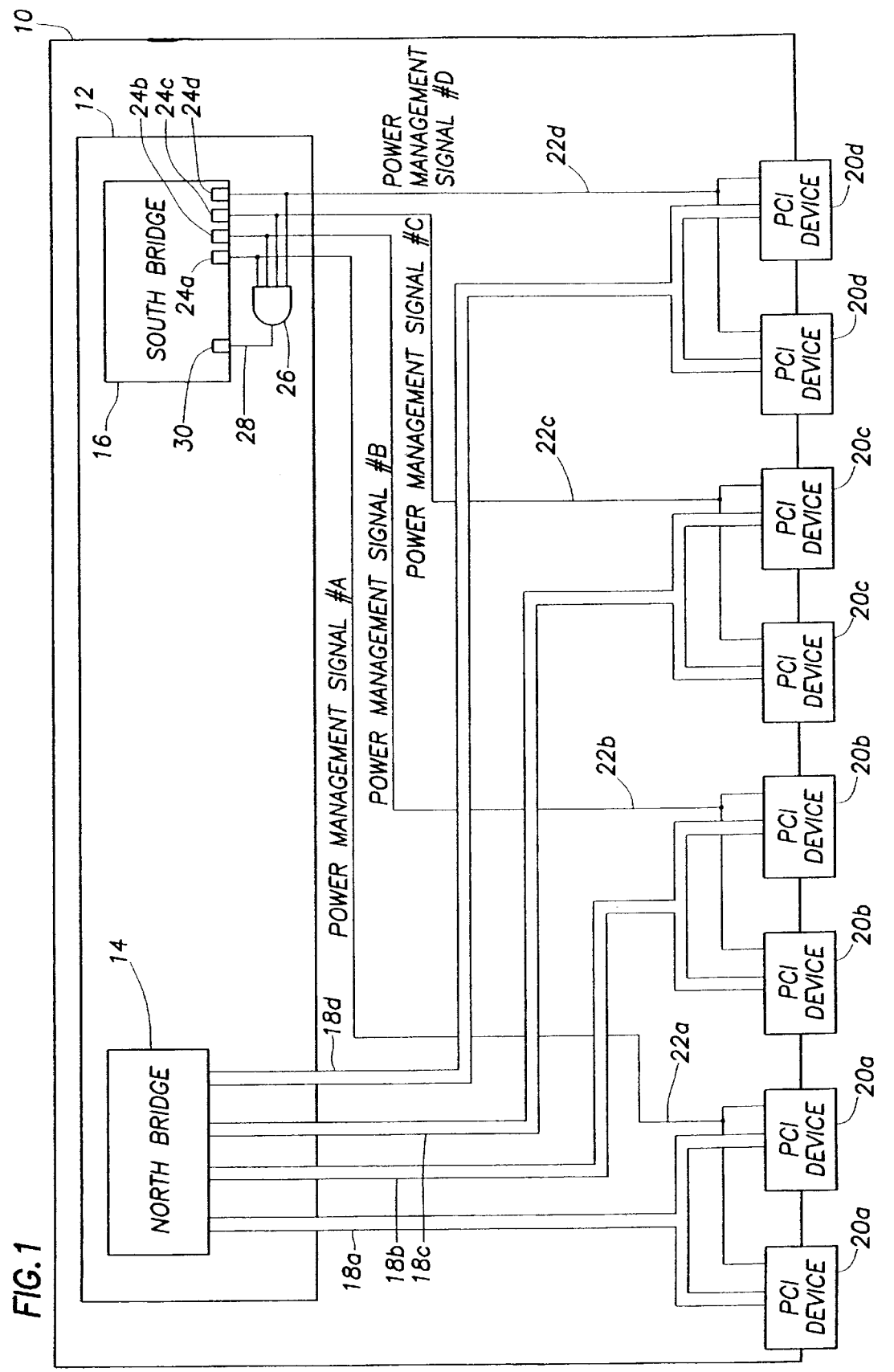
FIG. 1 is a diagram of a computer system.

FIG. 1 is a diagram of a computer system, shown generally at 10. Computer system 10 comprises a chip set 12. Chip set 12 is typically located on the motherboard in proximity to the CPU socket, expansion bus slots, and main memory. Generally, chip set 12 is a collection of integrated circuits that manage and interface with a number of computer subsystems ranging from CPU and memory to disk drives and peripherals such as mice. Chip set 12 serves as an interconnection between the CPU, system memory and bus subsystems of computer system 10. Because chip set 12 is basically the communications hub of the motherboard, chip set 12 determines how quickly and efficiently the CPU, memory, and bus I/O subsystems can communicate with each other. Computer system 10 comprises several buses that serve as a communication interconnection between the various components of the computer system. Chip set 12 controls these buses, and transfers information to and from the buses and the processor and memory. The capabilities of chip set 12 determine what kinds of buses the computer system can support, at what speed the buses can operate, and what additional features may be used by the buses. Examples of system buses include PCI, PCI-X, accelerated graphics port (AGP) and ISA. Most modern computer systems retain the ISA bus for slower peripherals and to maintain compatibility with older components.

Chip set 12 generally comprises two sections. The first section of chip set 12 is a north bridge 14, and the second section may be a power state management device such as a south bridge, a super I/O or any other device operable to control the power state of computer system 10. North bridge 14 may comprise several chips and provides an interface between chip set 12 and several components of computer system 10 including cache, RAM, CPU and buses. North bridge 14 is typically responsible for access to the processors, memory, and plug-in devices. The PCI host controller functionality is also generally included in north bridge 14. South bridge 16 typically comprises a single chip and performs the peripheral I/O operations of chip set 12, including the management of the IDE controllers as well as serial, parallel, USB, and other ports. Alternatively, a super I/O may be used instead of a south bridge. Super I/O controller 16 is a single chip that, much like chip set 12, performs many functions. Super I/O 16 typically is responsible for controlling the slower-speed, standard peripherals found in most computer systems. Because these peripherals have been mostly standardized, it is easier to integrate these device controllers into a commodity chip instead of providing a specific controller functionality for each device for each motherboard design. The major functions of super I/O controller chip 16 include controlling the serial ports, parallel ports, and floppy disk drives. Super I/O controller 16 may also include other functions such as the real-time clock, keyboard controller and IDE hard disk controllers. Both the south bridge and super I/O could include functionality for receiving power management signals and controlling whether or not computer system 10 needs to be powered up.

Computer system 10 comprises PCI buses 18 to communicatively couple computer system 10 to PCI devices 20. As discussed above, PCI bus 18 is a high-speed local I/O bus used for communicatively coupling PCI devices and peripherals 20 to the memory, chip set 12, and processor of computer system 10. PCI buses 18 are configured into a peer bus arrangement rather than a hierarchical arrangement. As discussed above, because each peer bus has direct access to north bridge 14, peer buses typically have higher throughput than hierarchical buses. PCI devices 20 may be external devices or components that are mounted inside the chassis of computer system 10. Examples of PCI devices 20 that may be coupled to PCI bus 18 include video cards, SCSI host adapters, disk storage devices, and high-speed networks interfaces, among other examples. The PCI bus uses its own internal interrupt system for managing requests from the cards or devices coupled to the bus. These interrupts are often called "#A", "#B", "#C", "#D" and so forth to avoid confusion with the normal numbered system IRQs. Power management signals or interrupts 22 may be communicated from a PCI devices 20 to a general purpose input 24 of south bridge or super I/O 16. Examples of power management signals include power management event (PME#) signals. Power management signals 22 are transmitted across the power management signal line, which is a section of PCI bus 18. Each PCI bus 18 will have an associated general purpose input 24. As a result, each general purpose input 24 is operable to receive the power management signal 22 that is transmitted across the associated PCI bus 18. For example, general purpose input 24a is associated with PCI bus 18a and will therefore receive power management signal #A 22a. The general purpose inputs 24 may simply be pins operable to indicate the voltage status of the line to which it is coupled. The general purpose inputs 24 are typically not operable to wake computer system 10, but are operable to indicate to the OS or ACPI subsystem the PCI bus 18 on which the power management signal 22 was asserted. For example, the general purpose input 24a may output a high or low voltage depending on whether power management signal #A 22a is being asserted.

A logic gate 26 is used to logically OR the power management signals 22. Because power management signals 22, such as PME# signals, are typically negatively asserted, logic gate 26 is preferably an AND logic gate. The logic gate 26 and the associated circuitry may either be incorporated into south bridge or super I/O 16 or may be a separate component. The resulting signal 28 is communicated to the dedicated power management signal input 30 of south bridge or super I/O 16. Because logic gate 26 may be operable to produce one signal 28 from any number of power management signals 22, only one dedicated power management signal input 30 is required regardless of the number of PCI devices 20 that may be located on different PCI buses 18. Thus, the ability to process power management signals 22 is independent of the number of dedicated power management signal inputs that are provided for by the chip set. The dedicated power management signal input 30 is operable to cause a power up and record the wake-up event in a register that may be accessed by the OS in response to receiving a power management signal 22. The present invention is not limited to the particular embodiment depicted in FIG. 1. For example, computer system 10 may incorporate more or less PCI buses 18, PCI devices 20, general purpose inputs 24 and other associated components than depicted in FIG. 1.

Figure 2:
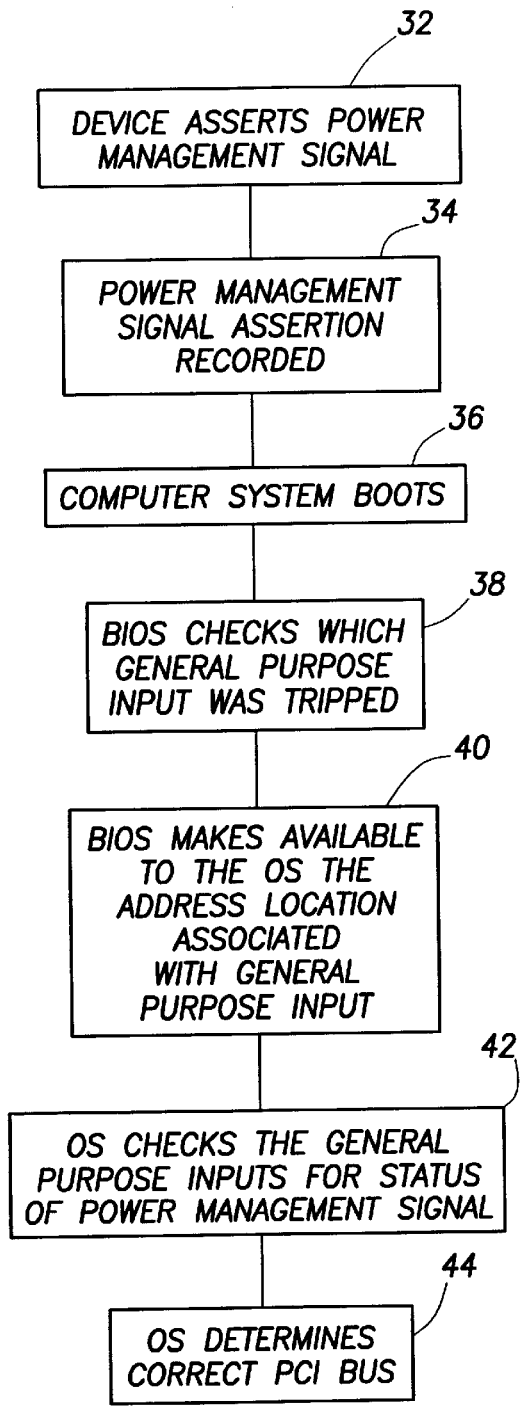
FIG. 2 is a flow diagram of one embodiment of the present invention.

FIG. 2 is a flow diagram of an embodiment of the system and method of the present invention. At step 32, one or more PCI devices 20 issues a power management signal 22. At this time, computer system 10 is powered down or in a sleep state. There are a variety of possible sleep states. For example, the computer system 10 itself may be powered down, but the current contents of the OS and all the running applications are suspended to a storage device. Another example of a sleep state is where the entire computer system 10 is powered down except for a particular component such as the main memory. Generally, a computer system can recover or power up from a sleep state more quickly than if the computer system had been completely powered down. The PCI devices 20 may issue power management signals 22 in response to an outside system or signal. For example, an outside system may attempt to access computer system 10. In this case, a PCI device 20, such as a network card, issues the power management signal 22 so that computer system 10 may power up and respond to the outside system. Alternatively, PCI devices 20 may issue power management signal 22 in response to an internal event. For example, a PCI device 20 may detect an imminent failure and will issue a power management signal 22 to wake computer system 10 in order to prevent data loss or corruption.

After the power management signals 22 are issued by the PCI devices 20, the power management signals 22 are received by the general purpose input 24 of the south bridge or super I/O 16. The power management signal assertion is then recorded by the general purpose input 24 at step 34. In addition, the AND logic gate 26 logically ORs the power management signals 22 into signal 28. Signal 28 is sent to dedicated power management signal input 30. Thus, power management signal input 30 will register a wake-up event if it receives one or more asserted power management signals 22. As a result, any of the power management signals 22 originating from PCI devices 20 is operable to wake or power up computer system 10. For example, if power management signal #B 22b and power management signal #C 22c are asserted, the status of general purpose inputs 24b and 24c will be changed and dedicated power management signal input 30 will register an assertion. Accordingly, at step 36, computer system 10 boots. If computer system 10 was in a sleep state, it will generally recover faster when it powers up than if it had been completely powered down when it received the wake up event.

Once computer system 10 wakes or boots, the BIOS starts its host routine and pre-operation self test. At this time, the BIOS examines the south bridge or super I/O 16 to determine whether computer system 10 powered-up as the result of a power management signal assertion. Upon verifying that computer system 10 powered-up as the result of a power management signal assertion, the BIOS determines which general purpose inputs 24 were tripped by the asserted power management signals 22 at step 38. Because the power management signal 22 is typically negatively asserted, the general purpose input 24 will generally exhibit a low voltage level, rather than a default high voltage level, in response to a power management signal 22 assertion. At step 40, the BIOS makes available to the OS the address location of the general purpose input 24 associated with the asserted power management signal. Next, at step 42, the OS checks the address location that directly corresponds to the general purpose input 24. For example, the OS may refer to the register location in the ACPI table that corresponds to the general purpose input 24 that received a power management signal, and check the value stored in that register location. This value may correspond to the PCI bus 18 on which a power management signal was asserted. Once the OS or ACPI determines which general purpose inputs 24 had been tripped, the OS or ACPI can then determine the PCI bus 18 on which resides the PCI device 20 that asserted the power management signal at step 44. After identifying the correct PCI bus 18, the OS can locate the asserting PCI device 20. Typically, the OS or ACPI system will query all of the PCI devices 20 on the PCI bus 18 until it has identified the asserting device. Once the OS has located the PCI device 20 that has been asserting the power management signal, the OS can acknowledge its power management signal assertion. Generally, a PCI device 20 will continuously assert a power management signal until it is acknowledged by the OS. Thus, once the OS has located the PCI device 20 that has been asserting a power management signal, the OS will acknowledge the power management signal assertion, and the PCI device 20 will cease asserting the power management signal.

For example, one of the PCI devices 20*b* on PCI bus 18*b* asserts a power management signal #B 22*b*. The assertion of the signal is reflected in general purpose input 24*b*. After the computer system boots, the BIOS determines that general purpose input 24*b* was tripped and makes available to the OS the address location directly associated with general purpose input 24*b*. The OS checks the address location associated with general purpose input 24*b* and checks the value stored in that location. This value allows the OS to identify PCI bus 18*b* as the PCI bus 18 on which the power management signal #B 22*b* was sent. The OS then checks all of the PCI devices 20*b* on PCI bus 18*b* until it has determined which PCI device 20*b* is asserting the power management signal #B 22*b*.

Figure 3:
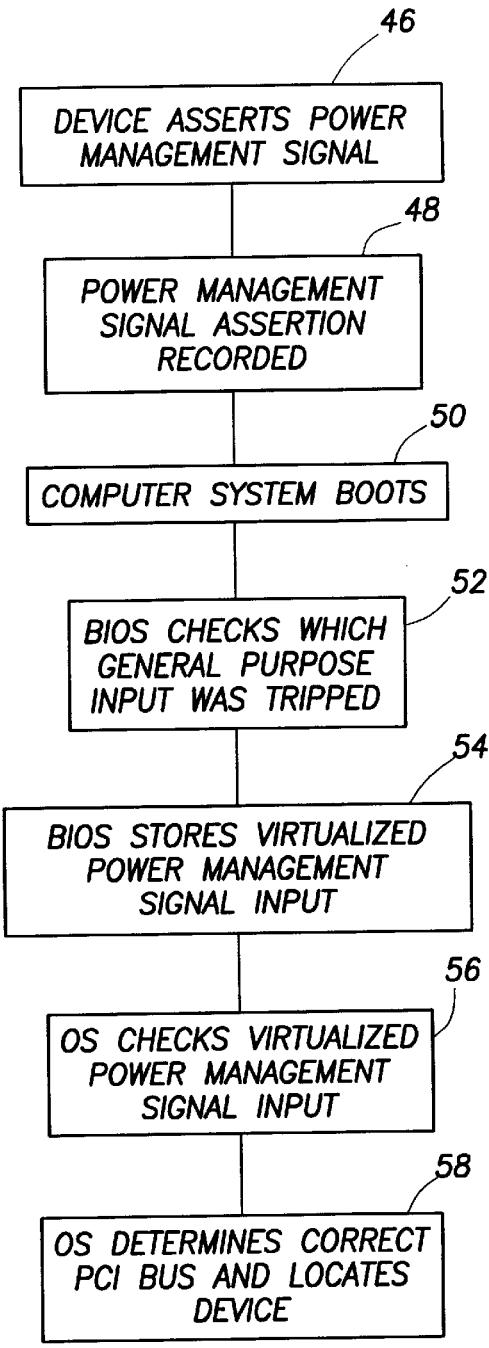
FIG. 3 is a flow diagram illustrating another embodiment of the present invention.

Alternatively, the present invention may be implemented with the use of virtualized power management signal inputs as shown in FIG. 3. At step 46, one or more PCI devices 20 assert a power management signal 22. At step 48, the power management signal 22 is received by the dedicated power management signal input 30 and the power management signal assertion is recorded by the general purpose input 24. After dedicated power management signal input 30 receives the power management signal 22 assertion, the computer system 10 boots at step 50. The BIOS then checks the south bridge or super I/O 16 to determine which general purpose inputs had been tripped at step 52. At step 54, the BIOS then records or stores which general purpose inputs 24 were tripped to the associated virtualized power management signal inputs or pins, instead of address locations that directly correspond to the general purpose inputs 24. These virtualized power management signal inputs are stored in a memory location, such as RAM, or another I/O address location that is accessible by the OS. For example, the address locations of the virtualized power management signal inputs may be stored in the status registers in the ACPI tables that are associated with power management signal status. Each virtual power management signal input is associated with a particular power management signal 22 and points to the PCI bus 18 on which this power management signal 22 was asserted. For example, power management signal #A 22*a*, power management signal #B 22*b*, power management signal #C 22*c*, and power management signal #D 22*d* will each be recorded as separate virtual power management signal inputs that will point to PCI buses 18*a*, 18*b*, 18*c* and 18*d* respectively. Thus, a virtual power management signal input is indistinguishable from an actual power management signal input from the viewpoint of the OS or ACPI subsystem.

After the BIOS has finished its startup tasks, the OS continues to load. At step 56, the OS or ACPI subsystem checks the virtualized power management signal inputs to determine on which PCI bus 18 resided the PCI device 20 that asserted the power management signal 22. For example, the OS may refer to the register location in the ACPI table that corresponds to the virtualized power management signal input and check the value stored in that register location. This value may correspond to the PCI bus 18 on which the PCI device 20 asserted the power management signal 22. In this case, the register location does not correspond to the actual general purpose input 24. For example, the register location for the actual general purpose input 24 may not be accessible by the OS. Instead, the OS is directed to the register location that corresponds to the virtual power management signal input. Once the correct PCI bus 18 has been identified, the OS can locate the PCI device 20 that asserted the power management signal 22 at step 58. Typically, the OS will scan the PCI bus 18 until it has identified the asserting PCI device 20. After it has been acknowledged by the OS, the PCI device 20 will then release the assertion of the power management signal 22.

Although the disclosed embodiments have been described in detail, it should be understood that various changes, substitutions, and alterations can be made to the embodiments without departing from the spirit and the scope of the invention.

What is claimed is:

1. A computer system having a peer bus architecture and operable to enter a powered down state comprising:
   a plurality of buses operable to couple the computer system to a plurality of devices, wherein each device is operable to send a power management signal, and wherein each bus is configured in a peer bus arrangement and is associated with a power management signal line operable to transmit power management signals;
   a power state management device operable for waking the computer system from a powered down state upon receiving a power management signal, comprising
      a dedicated power management signal input operable to receive a combined power management signal, wherein the combined power management signal is representative of the power management signal lines associated with each of the buses; and
      a plurality of general purpose inputs, wherein each general purpose input is coupled to a single power management signal line, and is operable to record whether that power management signal line transmitted a power management signal;
   a logic circuit operable to logically combine the power management signal lines to produce a combined power management signal as an input to the dedicated power management signal input, such that the power management device may wake the computer system if any device sends a power management signal that is transmitted across a power management signal line;
   a first software agent operable to review the general purpose inputs to determine which power management signal line transmitted a power management signal, and store the identity of the general purpose input in a memory location; and
   a second software agent operable to access the memory location to determine which general purpose input received the power management signal and thereby identify the bus that is associated with the power management signal line that transmitted a power management signal.

2. The computer system of claim 1, wherein the power management signal is a PME# signal.

3. The computer system of claim 1, wherein the power state management device is a south bridge.

4. The computer system of claim 3, wherein the south bridge comprises the logic circuit.

5. The computer system of claim 1, wherein the power state management device is a super I/O.

6. The computer system of claim 5, wherein the super I/O comprises the logic circuit.

7. The computer system of claim 1, wherein the logic circuit comprises an AND logic gate.

8. The computer system of claim 1, wherein the first software agent stores the identity of the general purpose input as a virtualized power management signal input.

9. The computer system of claim 8, wherein the virtualized power management signal input is stored in a RAM memory location.

10. The computer system of claim 8, wherein the virtualized power management signal input is stored in an I/O address location.

11. The computer system of claim 1, wherein the first software agent is a BIOS.

12. The computer system of claim 1, wherein the second software agent is an operating system.

13. The computer system of claim 1, wherein the second software agent is an ACPI subsystem of an operating system.

14. A method for providing an input functionality for a plurality of power management signals transmitted in a peer bus architecture to a computer system operable to enter a powered down state, comprising the steps of:

providing a plurality of devices operable to send a power management signal;

providing a plurality of buses operable to couple the computer system to the devices, wherein each bus is configured in a peer bus arrangement and is associated with a power management signal line operable to transmit power management signals;

providing a power state management device operable for waking the system from a powered down state upon receiving a combined power management signal, wherein the combined power management signal is representative of the power management signal lines associated with each of the buses, comprising a dedicated power management signal input operable to receive a combined power management signal; and a plurality of general purpose inputs, wherein each general purpose input is coupled to a single power management signal line, and is operable to record whether that power management signal line transmitted a power management signal;

providing a logic circuit operable to logically combine the power management signal lines to produce a combined power management signal as an input to the dedicated power management signal input, such that the power management device may wake the computer system if any device sends a power management signal that is transmitted across a power management signal line;

providing a first software agent operable to review the general purpose inputs to determine which power management signal line transmitted a power management signal, and store the identity of the general purpose input in a memory location;

providing a second software agent operable to access the memory location to determine which general purpose input received the power management signal and thereby identify the bus that is associated with the power management signal line that transmitted a power management signal;

sending a power management signal across a power management signal line to be received be a general purpose input and a dedicated power management signal input;

recording which power management signal line transmitted the power management signal;

powering up the computer system;

storing the identity of the general purpose input that received the power management signal;

accessing the memory location to determine which general purpose input received the power management signal; and determining which bus was associated with the power management signal line that transmitted the power management signal.

15. The method of claim 14, wherein the power management signal is a PME# signal.

16. The method of claim 14, wherein the step of storing the identity of the general purpose input further comprises the step of storing the identity of the general purpose input as a virtualized power management signal input.

17. The method of claim 16, wherein the memory location is a RAM memory location.

18. The method of claim 16, wherein the memory location is an I/O address location.

19. The method of claim 14, wherein the power state management device is a south bridge.

20. The method of claim 19, wherein the south bridge comprises the logic circuit.

21. The method of claim 14, wherein the power state management device is a super I/O.

22. The method of claim 21, wherein the super I/O comprises the logic circuit.

23. The method of claim 14, wherein the logic circuit comprises an AND logic gate.

24. The method of claim 14, wherein the first software agent is a BIOS.

25. The method of claim 14, wherein the second software agent is an operating system.

26. The method of claim 14, wherein the second software agent is an ACPI subsystem of an operating system.

* * * * *